United States Patent [19]
Emery

[11] Patent Number: 5,588,724
[45] Date of Patent: Dec. 31, 1996

[54] CAMP KITCHEN CABINET

[76] Inventor: David Emery, 108A Taylortown Rd., Boonton, N.J. 07005

[21] Appl. No.: 419,440

[22] Filed: Apr. 10, 1995

[51] Int. Cl.⁶ ................................................. A47B 77/08
[52] U.S. Cl. ........................... 312/236; 312/216; 312/400
[58] Field of Search ..................... 312/236, 400, 312/401, 404, 100, 107.5, 216, 240, 241, 244, 281, 902; 297/180.1, 188.08; 296/22, 168; 108/65, 72

[56] References Cited

U.S. PATENT DOCUMENTS

| | | | |
|---|---|---|---|
| 788,678 | 5/1905 | Simpson | 312/236 X |
| 878,769 | 2/1908 | Campbell | 312/236 X |
| 1,240,997 | 9/1917 | Moore | 312/236 X |
| 1,258,655 | 3/1918 | Craw | 312/236 X |
| 1,282,241 | 10/1918 | Kosmerl | 312/236 X |
| 1,291,248 | 1/1919 | Taylor | 312/236 |
| 1,513,357 | 10/1924 | Weber | 312/236 X |
| 1,582,346 | 4/1926 | Oster | 312/236 |
| 1,738,004 | 12/1929 | Holden | 312/216 |
| 2,556,153 | 6/1951 | Collins | 312/281 X |
| 3,606,445 | 9/1971 | Wunderlich | 296/168 |
| 3,663,081 | 5/1972 | Williams | 312/236 |
| 3,748,437 | 7/1973 | Keeshin et al. | 312/236 X |
| 3,823,992 | 7/1974 | Corbett | 312/236 X |
| 3,866,994 | 2/1975 | Bonin | 312/236 |
| 4,662,515 | 5/1987 | Newby, Sr. | 312/902 X |
| 4,898,294 | 2/1990 | Jennings | 312/236 X |

*Primary Examiner*—Peter M. Cuomo
*Assistant Examiner*—James O. Hansen

[57] ABSTRACT

The camp kitchen cabinet structure of the invention is arranged to employ a housing, having a first row of shelves, each shelf having an abutment plate, with an intermediate row of shelves, each having an abutment plate, wherein the intermediate row includes a lowermost cavity arranged to accommodate various camping paraphernalia having extended height, with each of the shelves of various heights to accommodate various components. A cooler cabinet is selectively received within the cabinet structure of the invention for subsequent use. A top wall includes a hinged member arranged to accommodate storage and a utilizty shelf during use.

4 Claims, 3 Drawing Sheets

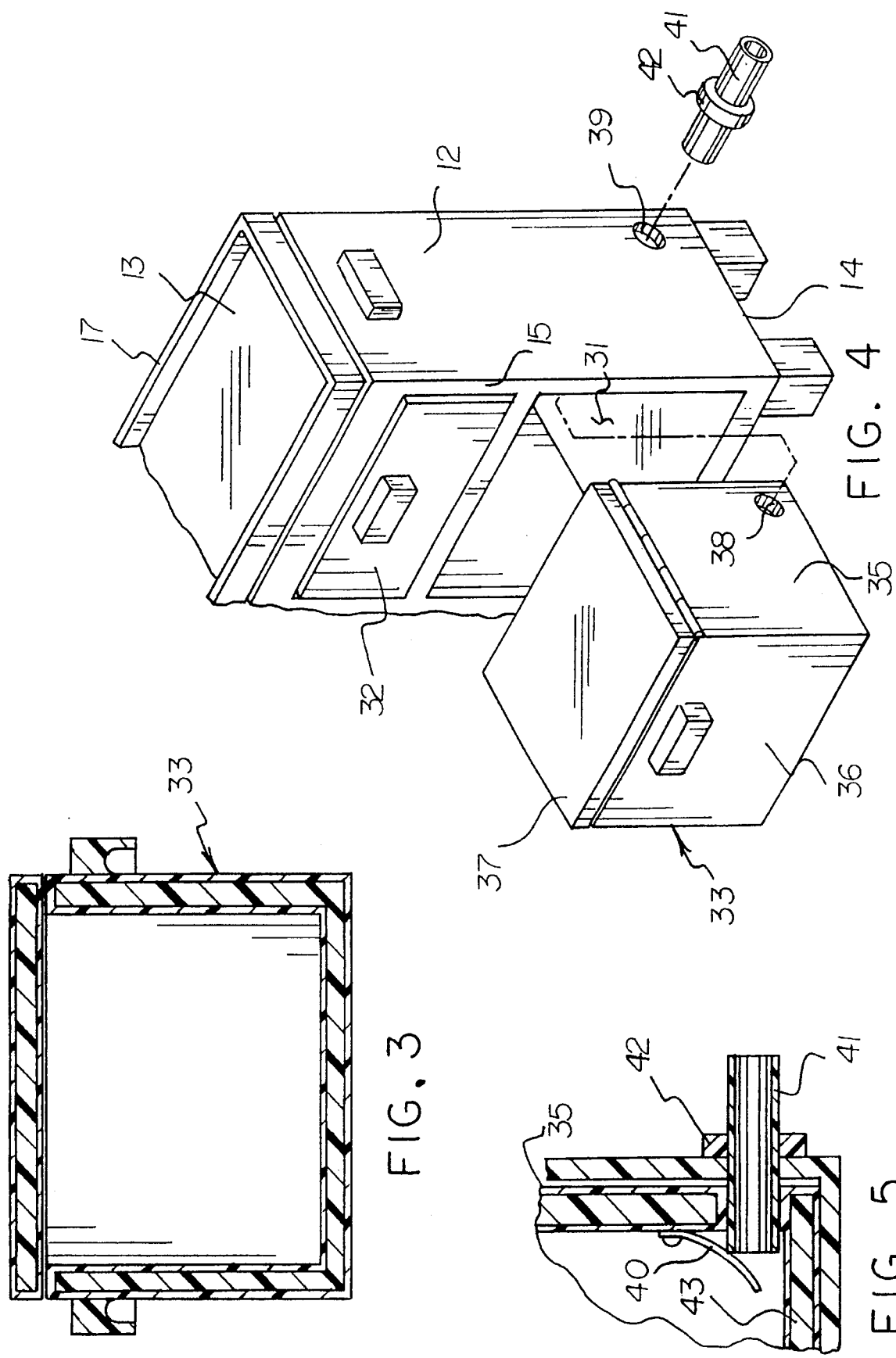

CAMP KITCHEN CABINET

TECHNICAL FIELD

The field of invention relates to camping equipment, more particularly to a camp kitchen cabinet arranged to accommodate and store various camping components for their ease use during a camping procedure.

BACKGROUND OF THE INVENTION

The prior art available to the Applicant as much as understood is directed to the U.S. Pat. Nos. 3,606,445; 3,667,709; 3,809,425; 4,089,554; 4,131,327; and 4,181,348.

The instant invention is directed to improvements in the prior art by providing for a cabinet structure arranged to store various camping paraphernalia in an orderly and usable manner.

SUMMARY OF THE INVENTION

The camp kitchen cabinet structure of the invention is arranged to employ a housing, having a first row of shelves, each shelf having an abutment plate, with an intermediate row of shelves, each having an abutment plate, wherein the intermediate row includes a lowermost cavity arranged to accommodate various camping paraphernalia having extended height, with each of the shelves of various heights to accommodate various components. A cooler cabinet is selectively received within the cabinet structure of the invention for subsequent use. A top wall includes a hinged member arranged to accommodate storage and a utility shelf during use.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is a cross-sectional view, taken along the lines 3—3 of FIG. 2 as indicated.

FIG. 4 is a partial perspective illustration indicating the cooler cabinet separated relative to the cabinet structure.

FIG. 5 is an enlarged cross-sectional illustration indicating the drain tube structure arranged to join the cooler relative to the cabinet when the cooler is inserted within the cabinet, in a manner as indicated in FIG. 1.

DESCRIPTION OF THE PREFERRED EMBODIMENT

Figure 1:
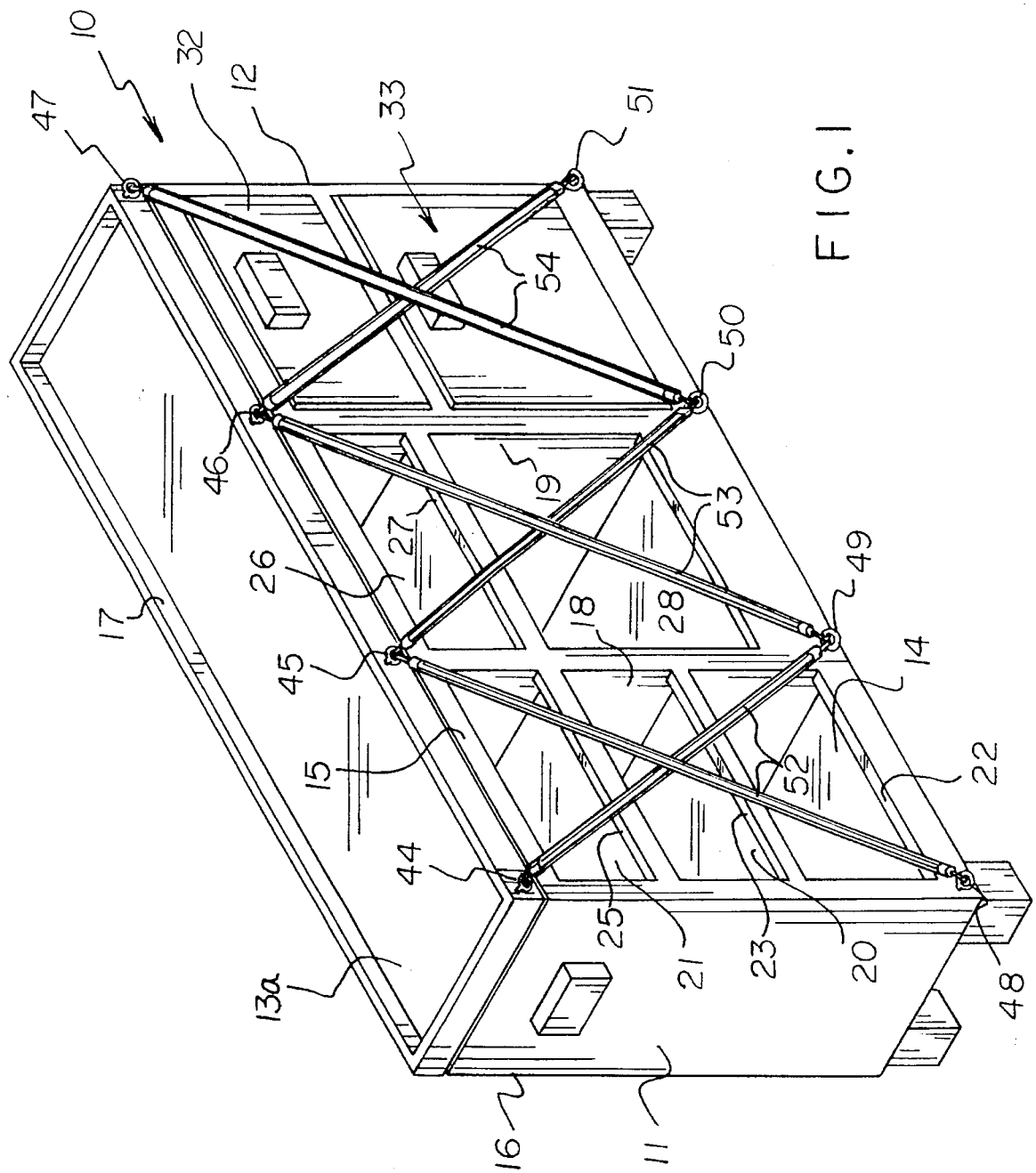
FIG. 1 is a perspective illustration of the invention.

As required, detailed embodiments of the present invention are disclosed herein; however, it is to be understood that the disclosed embodiments are merely exemplary of the invention, which may be embodied in various forms. therefore, specific structural and functional details disclosed herein are not to be interpreted as limiting, but merely as a basis for the claims and as a representative basis for teaching one skilled in the art to variously employ the present invention in virtually any appropriately detailed structure.

The camp kitchen cabinet 10 of the invention comprises a first side wall 11 spaced from a second side wall 12, a top wall 13 spaced from a bottom wall 14, and a front wall 15 spaced from a rear wall 16. With reference to the FIGS. 1 and 2, a top wall plate 13a is coextensive with the top wall 13 at a first position and coplanar with the top wall 13 in a second position, such as illustrated in FIG. 2 and to this end, a hinge 24 hingedly connects the top wall 13 relative to the rear wall 16. A continuous flange 17 integrally secured to a periphery of the top wall plate 13a extends upwardly therefrom to provide for containment of various components onto the top wall plate 13a when the top wall plate 13a is in the first position.

First and second intermediate walls 18 and 19 are arranged in a parallel relationship relative to one another and are spaced between the first and second side walls 11 and 12 and spaced relative to one another, such that the first intermediate wall 18 has respective first and second shelf plates 20 and 21 extending between the first intermediate wall 18 and the first side wall 11 such that the bottom wall 14 between the first intermediate wall 18 and the first side wall 11 defines a storage support as do the first and second shelf plates 20 and 21. To effect containment of components directed upon the shelf plates 20 and 21 and the bottom wall 14 between the first intermediate wall 18 and the first side wall 11 respective first, second, and third abutment lips 22, 23, and 25 extend upwardly from the respective bottom wall 14 first shelf plate 20, and second shelf plate 21 respectively between the first intermediate wall 18 and the first side wall 11.

A third shelf plate 26 extends between the first intermediate wall 18 and the second intermediate wall 19 above the bottom wall 14, and the third shelf plate 26 is arranged in substantial alignment with the second shelf plate 21 to provide for enlarged storage capacity between the third shelf plate 26 and the bottom wall 14 to accommodate various larger components in camping, such as camp stoves and the like, and further to this end, the use of respective fourth and fifth abutment lips 27 and 28 extending upwardly from the third shelf plate 26 and the bottom wall 14 between the first and second intermediate walls 18 and 19 assist in maintaining components within the cabinet structure.

With reference to FIG. 2 for example indicates the use of a fourth shelf plate 29 extending between the second intermediate wall 19 and the second side wall 12 to define a first storage cavity 30 between the fourth shelf plate 29 and the top wall 13 and a second storage cavity 31 between the fourth shelf plate 29 and the bottom wall 14, such that a slide drawer 32 is receivable within the first storage cavity 30 and an insulated cooler container 33 is slidably received within the second cavity 31. The cooler container 33 is provided with respective container first and second side walls 34 and 35, as well as container front wall 36, a container lid 37, as well as a container floor 43 (see FIG. 5). The container's second side wall 35 includes a container side wall opening 38 directed through the container's second side wall 35 adjacent to the container's floor 43 (see FIG. 5) that is in alignment with a second side wall opening 39 directed through the cabinet's second side wall 12 when the container 33 is complementarily received within the second storage cavity 31. As noted in FIG. 5, a resilient flange 40 positioned within the container extends over the container side wall opening 38 and is displaced therefrom by a drain tube 41 received through the container side wall opening 38 and the second side wall opening 39 to form a dual purpose of securing the container 33 within the second storage cavity 31, as well as providing for a drain tube 41 extending through the cabinet structure and to this end, the drain tube 41 is provided with a drain tube abutment 42 extending exteriorly of the drain tube 41 to prevent projection within the second side wall opening 39 when the drain tube 41 is directed therein, in a manner as indicated in FIG. 5.

Figure 2:
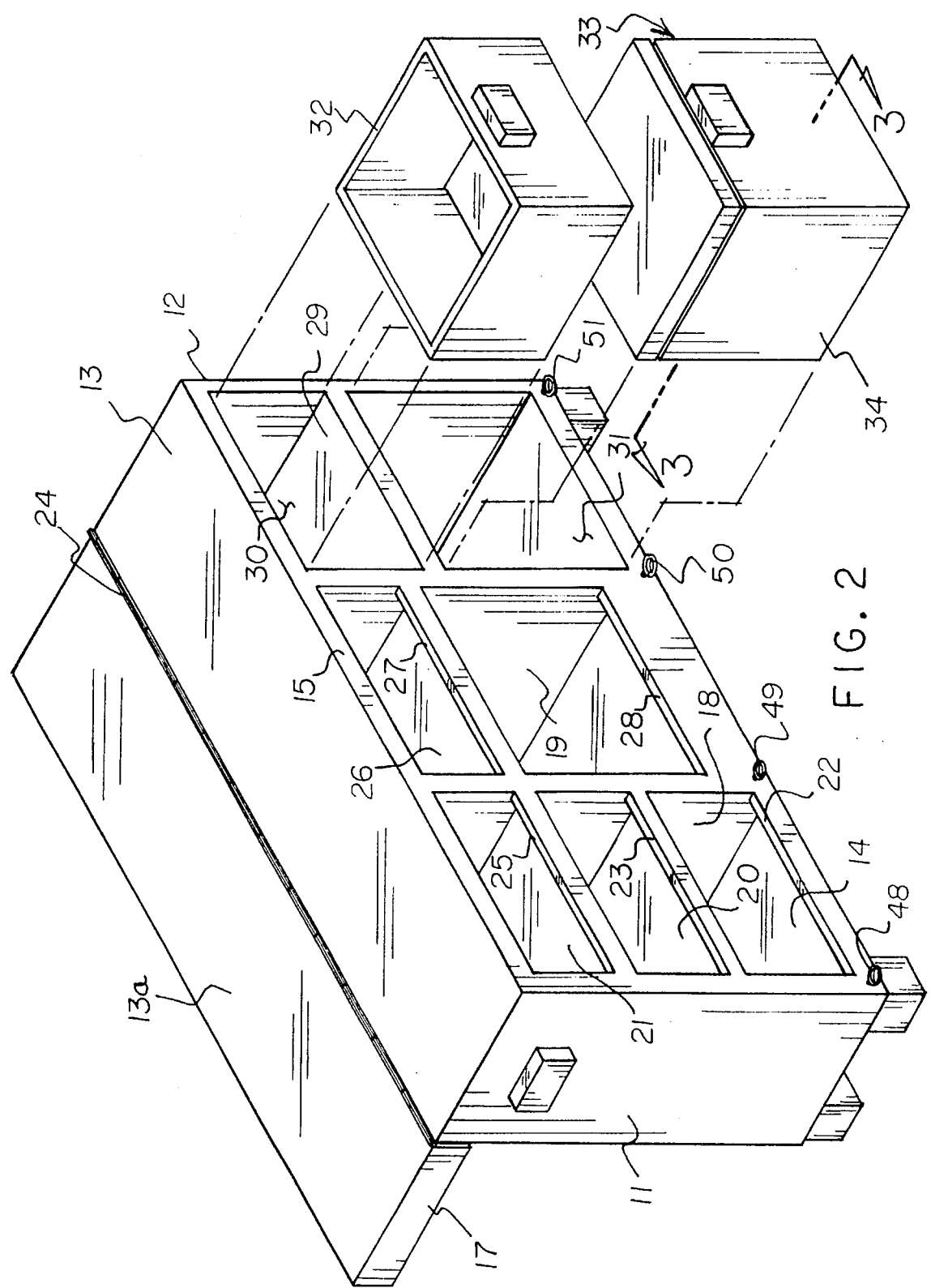
FIG. 2 is a further perspective illustration of the invention indicating the various components displaced relative to the orientation of FIG. 1.

During transport of the cabinet structure 10 and to maintain components within the cabinet during such transport, respective first, second, third, and fourth hook members 44,45,46 and 47 are directed into the containers flange 17, with the first hook member 44 aligned with the first side wall 11, the second hook member 45 aligned with the first intermediate wall 18, the third hook member 46 aligned with the second intermediate wall 19, and the fourth hook member 47 aligned with the second side wall 12 when the top wall plate 13a is in the first position, such as illustrated in FIG. 1. A respective fifth, sixth, seventh, and eighth hook member 48, 49, 50, and 51 are directed into the front wall 15 of the cabinet structure adjacent the bottom wall 14 in respective alignment with respective first, second, third, and fourth hook members 44, 45, 46, and 47 as indicated. To this end, respective first, second, and third resilient cord pairs 52, 53, and 54 are provided, with each cord of each cord pair provided with a hook member at each end to extend over the front wall of the cabinet structure, such that the first cord pair 52 extends in a crossed relationship between the first side wall 11 and the first intermediate wall 18, with the second cord pair 53 extending between the first intermediate wall 18 and the second intermediate wall 19, and the third cord pair extending between the second intermediate wall 19 and the second side wall 12. It should be noted that only one cord may be employed if desired of each pair, but the cord pairs utilized in combination permit greater accommodation of components within the cabinet structure in use.

It is also noted that the use of the device is arranged for ease of transport to and from camp sites, particularly by self-propelled vehicles and to this end, it should be noted that typically the cabinet structure 10 is arranged for orientation between the wheel wells of various self-propelled vehicles for ease of transport and use of the device.

It is to be understood that while certain forms of the present invention have been illustrated and described herein, it is not to be limited to the specific forms or arrangement of parts described and shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed and desired to be protected by Letters Patent of the United States is as follows:

1. A camp kitchen cabinet comprising, a housing having a first side wall spaced from a second side wall, a top wall spaced from a bottom wall, and a front wall spaced from a rear wall, and at least one intermediate wall extending between the top wall and the bottom wall, and a plurality of shelf plates, wherein one of said plurality of shelf plates extends from the at least one intermediate wall to the first side wall to define a storage support member, and a further shelf plate of said plurality of shelf plates extends from a further intermediate wall to the second side wall to define a first storage cavity between the further shelf plate and the top wall, and a second storage cavity between the further shelf plate and the bottom wall, with a storage member slideably received within the first storage cavity, and a cooler container slideably received within the second storage cavity, and retaining means extending from the cooler container and through the cabinet second side wall for selectively securing the cooler container within the second storage cavity when the cooler container is complementarily received within the second storage cavity, and a top wall plate, wherein the top wall plate is arranged to include a hinge member hingedly securing the top wall plate to the rear wall, and the top wall plate is coextensive with the top wall in a first position and is substantially coplanar with the top wall in a second position, a continuous flange integrally secured to the top wall plate, the continuous flange extending about a periphery of the top wall plate, at least one hook member secured to the cabinet front wall, at least one further hook member secured to the continuous flange, and at least one resilient cord member, the resilient cord member having a cord hook at each end thereof for securement to each said hook to extend over the first storage cavity and the second storage cavity.

2. A cabinet as set forth in claim 1, wherein the cooler container includes a container first side wall spaced from a container second side wall, a container lid removably mounted relative to the cooler container for access within the cooler container, and wherein the retaining means includes drainage means extending from the container second side wall through the cabinet second side wall.

3. A cabinet as set forth in claim 2 wherein the drainage means includes a container side wall opening directed through the container's second side wall adjacent to a container floor, and the cabinet second side wall having a second side wall opening, with the container side wall opening and the second side wall opening aligned relative to one another when the container is complementarily received within the second storage cavity, and a drain tube slidably received through the container side wall opening and the second side wall opening.

4. A cabinet as set forth in claim 3 wherein the drain tube includes an abutment arranged to engage an exterior surface of the cabinet's second side wall.

* * * * *